United States Patent
Beck et al.

(10) Patent No.: US 11,512,707 B2
(45) Date of Patent: Nov. 29, 2022

(54) HYBRID MAGNETIC THRUST BEARING IN AN ELECTRIC SUBMERSIBLE PUMP (ESP) ASSEMBLY

(71) Applicant: Halliburton Energy Services, Inc., Houston, TX (US)

(72) Inventors: David Christopher Beck, Broken Arrow, OK (US); Christopher Watson, Claremore, OK (US); Robert C. de Long, Sand Springs, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 208 days.

(21) Appl. No.: 16/899,771

(22) Filed: Jun. 12, 2020

(65) Prior Publication Data
US 2021/0372419 A1 Dec. 2, 2021

Related U.S. Application Data

(63) Continuation-in-part of application No. 16/886,215, filed on May 28, 2020, now abandoned.

(51) Int. Cl.
*F04D 29/048* (2006.01)
*F16C 32/04* (2006.01)
(Continued)

(52) U.S. Cl.
CPC .......... *F04D 29/048* (2013.01); *F04D 13/10* (2013.01); *F04D 29/0413* (2013.01);
(Continued)

(58) Field of Classification Search
CPC .............. F16C 32/0476; F16C 2360/44; F16C 32/0402; F16C 32/0417; F16C 32/0419; F16C 32/0427; F01D 25/16; F04D 13/10; F04D 29/048; F04D 29/0413; F04D 29/051; F04D 29/0513; F04D 29/445
See application file for complete search history.

(56) References Cited

U.S. PATENT DOCUMENTS 2,568,548 A 4/1946 Howard et al.
3,233,950 A 2/1966 Baermann
(Continued)

FOREIGN PATENT DOCUMENTS

AU 2009244521 A1 11/2009
CA 2492069 A1 1/2004
(Continued)

OTHER PUBLICATIONS

Electronic Filing Acknowledgement Receipt, Specification and Drawing for U.S. Appl. No. 16/886,208, filed May 28, 2020, titled "Shielding for a Magnetic Bearing in an Electric Submersible Pump (ESP) Assembly," 46 pages.
(Continued)

*Primary Examiner* — Kenneth J Hansen
(74) *Attorney, Agent, or Firm* — Conley Rose, P.C.; Rodney B. Carroll

(57) ABSTRACT

An electric submersible pump (ESP) assembly. The ESP assembly comprises an electric motor, a centrifugal pump, and a hybrid magnetic thrust bearing, wherein the hybrid magnetic thrust bearing is disposed inside the electric motor or disposed inside the centrifugal pump.

20 Claims, 13 Drawing Sheets

(51) Int. Cl.
*F04D 13/10* (2006.01)
*F04D 29/041* (2006.01)
*F04D 29/44* (2006.01)

(52) U.S. Cl.
CPC ........ *F04D 29/445* (2013.01); *F16C 32/0476* (2013.01); *F05D 2240/511* (2013.01); *F16C 2360/44* (2013.01)

(56) References Cited

U.S. PATENT DOCUMENTS

| | | | |
|---|---|---|---|
| 3,377,113 A * | 4/1968 | Wilson | F16C 32/0402 384/624 |
| 4,128,280 A | 12/1978 | Purtschert | |
| 4,379,598 A | 4/1983 | Goldowsky | |
| 5,495,221 A | 2/1996 | Post | |
| 5,749,700 A | 5/1998 | Henry et al. | |
| 6,255,752 B1 | 7/2001 | Werner | |
| 6,545,378 B2 | 4/2003 | Chen et al. | |
| 6,657,344 B2 | 12/2003 | Post | |
| 6,700,258 B2 | 3/2004 | McMullen et al. | |
| 6,727,617 B2 | 4/2004 | McMullen et al. | |
| 6,965,181 B1 | 11/2005 | Heshmat et al. | |
| 8,330,455 B2 | 12/2012 | Duppe et al. | |
| 8,636,479 B2 | 1/2014 | Kenyon et al. | |
| 8,696,331 B2 | 4/2014 | Cunningham et al. | |
| 2003/0155829 A1 | 8/2003 | McMullen et al. | |
| 2004/0113502 A1 | 6/2004 | Li et al. | |
| 2004/0234391 A1 | 11/2004 | Izraelev | |
| 2006/0037743 A1 * | 2/2006 | Head | F04D 13/10 166/66.4 |
| 2006/0110271 A1 | 5/2006 | Klabunde et al. | |
| 2006/0279149 A1 | 12/2006 | Asper | |
| 2007/0280571 A1 | 12/2007 | Satoji et al. | |
| 2008/0111434 A1 | 5/2008 | Head | |
| 2008/0284268 A1 | 11/2008 | Yuratich et al. | |
| 2011/0052432 A1 | 3/2011 | Cunningham et al. | |
| 2012/0107143 A1 * | 5/2012 | Gilarranz | F04D 25/16 417/423.8 |
| 2014/0347152 A1 | 11/2014 | Aronstam et al. | |
| 2015/0349603 A1 | 12/2015 | Parmeter | |
| 2016/0190893 A1 | 6/2016 | Parmeter et al. | |
| 2018/0051700 A1 * | 2/2018 | Sheth | E21B 47/008 |
| 2018/0100543 A1 * | 4/2018 | Hyatt | F04D 13/10 |
| 2018/0291907 A1 * | 10/2018 | Ye | F04D 29/026 |
| 2019/0085671 A1 * | 3/2019 | Biddick | F04D 13/086 |

FOREIGN PATENT DOCUMENTS

| | | |
|---|---|---|
| CN | 101846131 A | 9/2010 |
| CN | 201726242 U | 1/2011 |
| CN | 104696262 A | 6/2015 |
| EP | 0355796 A2 | 2/1990 |
| EP | 0523002 A1 | 1/1993 |
| EP | 0566806 A1 | 10/1993 |
| EP | 2300687 B1 | 12/2018 |
| JP | 3121819 B2 | 1/2001 |
| WO | 2014133397 A1 | 9/2014 |
| WO | 2018071478 A1 | 4/2018 |

OTHER PUBLICATIONS

Electronic Filing Acknowledgement Receipt, Specification and Drawing for U.S. Appl. No. 16/886,213, filed May 28, 2020, titled "Hybrid Magnetic Radial Bearing in an Electric Submersible Pump (ESP) Assembly," 42 pages.
Electronic Acknowledgement Receipt, Specification and Drawings for International Application No. PCT/US2020/035719, filed Jun. 2, 2020, entitled "Shielding for a Magnetic Bearing in an Electric Submersible Pump (ESP) Assembly," 43 pages.
Electronic Acknowledgement Receipt, Specification and Drawings for International Application No. PCT/US2020/035715, filed Jun. 2, 2020, entitled "Hybrid Magnetic Radial Bearing in an Electric Submersible Pump (ESP) Assembly," 39 pages.
Electronic Acknowledgement Receipt, Specification and Drawings for International Application No. PCT/US2020/039182, filed Jun. 23, 2020, entitled "Hybrid Magnetic Thrust Bearing in an Electric Submersible Pump (ESP) Assembly," 42 pages.
International Search Report and Written Opinion of the International Searching Authority, International Application No. PCT/US2020/035715, dated Nov. 30, 2020, 12 pages.
International Search Report and Written Opinion of the International Searching Authority, International Application No. PCT/US2020/035719, dated Nov. 30, 2020, 12 pages.
Foreign Communication from Related Application—International Search Report and Written Opinion of the International Searching Authority, International Application No. PCT/US2020/039182, dated Feb. 22, 2021, 11 pages.
Office Action (32 Pages), dated Oct. 14, 2022, U.S. Appl. No. 16/886,208, filed May 28, 2020.

* cited by examiner

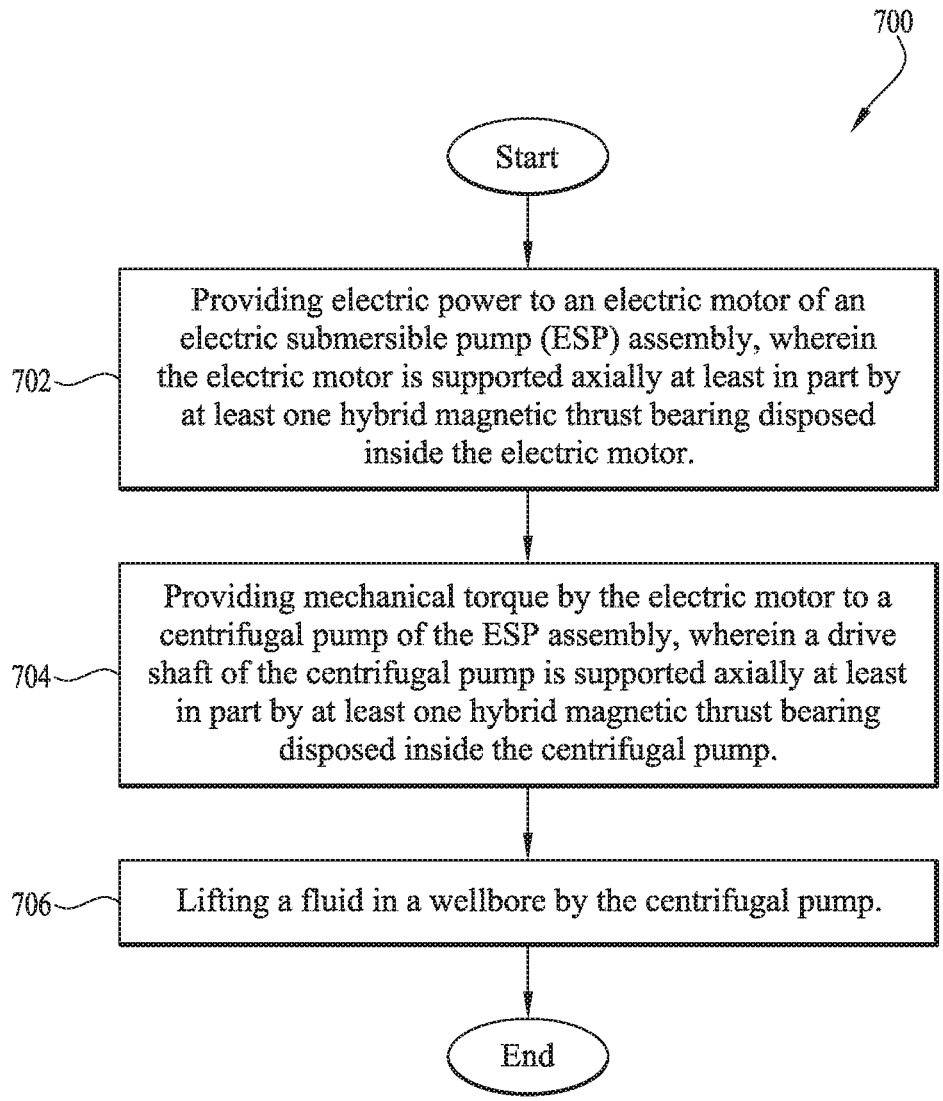

HYBRID MAGNETIC THRUST BEARING IN AN ELECTRIC SUBMERSIBLE PUMP (ESP) ASSEMBLY

CROSS-REFERENCE TO RELATED APPLICATIONS

The present application is a continuation-in-part of U.S. patent application Ser. No. 16/886,215 filed May 28, 2020 by David Christopher Beck et al., and entitled "Hybrid Magnetic Thrust Bearing in an Electric Submersible Pump (ESP) Assembly," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Electric submersible pump (ESP) assemblies are used to artificially lift fluid to the surface in deep wells such as oil or water wells. A typical ESP assembly comprises, from bottom to top, an electric motor, a seal unit, a pump intake, and a centrifugal pump, which are all mechanically connected together with shafts and shaft couplings. The electric motor supplies torque to the shafts, which provides power to the centrifugal pump. The electric motor is isolated from a wellbore environment by a housing and by the seal unit. The seal unit acts as an oil reservoir for the electric motor. The oil functions both as a dielectric fluid and as a lubricant in the electric motor. The seal unit also may provide pressure equalization between the electric motor and the wellbore environment. The centrifugal pump transforms mechanical torque received from the electric motor via a drive shaft to fluid pressure to lift fluid up the wellbore. The electric motor is generally connected to a power source located at the surface of the well using a cable and a motor lead extension. The ESP assembly is placed into the well and usually is inside a well casing. In a cased completion, the well casing separates the ESP assembly from the surrounding formation. Perforations in the well casing allow well fluid to enter the well casing and flow to the pump intake.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 7 is a flow chart of another method according to an embodiment of the disclosure.

DETAILED DESCRIPTION

Figure 1:
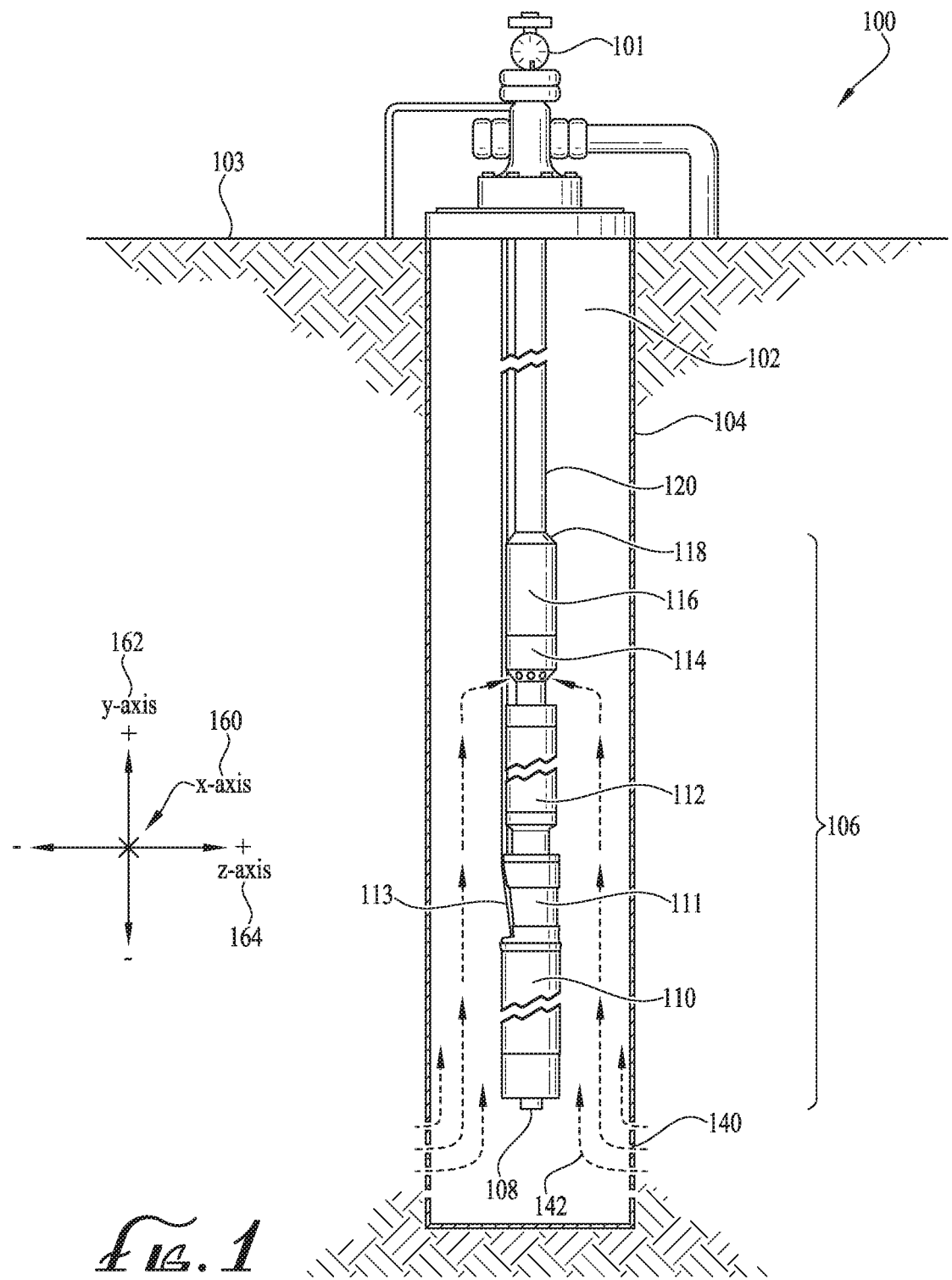
FIG. 1 is an illustration of an electric submersible pump (ESP) assembly disposed in a wellbore according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As used herein, orientation terms "upstream," "downstream," "up," and "down" are defined relative to the direction of flow of well fluid in the well casing. "Upstream" is directed counter to the direction of flow of well fluid, towards the source of well fluid (e.g., towards perforations in well casing through which hydrocarbons flow out of a subterranean formation and into the casing). "Downstream" is directed in the direction of flow of well fluid, away from the source of well fluid. "Down" is directed counter to the direction of flow of well fluid, towards the source of well fluid. "Up" is directed in the direction of flow of well fluid, away from the source of well fluid.

Rotating components of electric submersible pump (ESP) assemblies may be axially supported by thrust bearings. As used herein, axially supporting rotating ESP components means transferring at least part of an axial force (e.g., a force acting in a direction parallel to an axis of rotation of the rotating ESP components) exerted by the rotating components to a housing and/or non-rotating component of the ESP assembly. The axial force may be transferred from the rotating ESP components by one or more drive shafts via one or more thrust bearings to the housing and/or non-rotating components of the ESP assembly. The axial force may be directed downhole or uphole. The axial force may be developed in part by weight of rotating components. The axial force due to weight of rotating components may vary between different well completions according as the ESP assembly is disposed mostly vertically or mostly horizontally in the wellbore. The axial force may be developed in part by a thrust force developed by impellers of a centrifugal pump of the ESP assembly. In some operation regimes of a centrifugal pump the thrust force developed by the impellers may be such that a net uphole force is developed, but typically the net axial force is directed downhole.

Wear and tear on ESP assembly thrust bearings effect the longevity of the ESP assemblies. Premature wear of ESP assembly thrust bearings may entail pulling ESP assemblies for replacement more frequently and lead to increased non-producing down time as well as increased costs related to servicing the ESP assembly at the well site and increased equipment costs. The present disclosure teaches use of hybrid magnetic thrust bearings to extend the service life of thrust bearings and thereby extend the service life of the ESP assemblies. The hybrid magnetic thrust bearings taught herein augment traditional fluid film force with magnetic force. As a result, a surface smoothness tolerance can be relaxed for the bearing surfaces of the hybrid magnetic thrust bearings. This relaxed smoothness tolerance may reduce the cost of manufacturing the bearings. Additionally, clearances between bearing surfaces may be increased, which improves heat transfer due to a greater volume of fluid film between the bearing surfaces. This better heat transfer may allow the ESP assembly to be operated in higher temperature downhole environments than otherwise and/or may extend the service life of the ESP assembly. This greater clearance between the bearing surfaces may further reduce wear on the hybrid magnetic thrust bearings relative to conventional thrust bearings from abrasive particles encountered during ESP assembly operation, for example sand and metal particles entrained in the fluid flowing in the centrifugal pump. As described in more detail with reference to FIG. 5A and FIG. 5B below, the hybrid magnetic thrust bearings taught herein may counteract oscillatory vibrations that sometimes develop in conventional thrust bearings as a result of eccentric wear and may in part correct any eccentric wear which may develop in the hybrid magnetic thrust bearings.

Turning now to FIG. 1, a producing well environment 100 is described. In an embodiment, the environment 100 comprises a wellhead 101 above a wellbore 102 located at the surface 103. A casing 104 is provided within the wellbore 102. FIG. 1 provides a directional reference comprising three coordinate axes—an X-axis 160 where positive displacements along the X-axis 160 are directed into the sheet and negative displacements along the X-axis 160 are directed out of the sheet; a Y-axis 162 where positive displacements along the Y-axis 162 are directed upwards on the sheet and negative displacements along the Y-axis 162 are directed downwards on the sheet; and a Z-axis 164 where positive displacements along the Z-axis 164 are directed rightwards on the sheet and negative displacements along the Z-axis 164 are directed leftwards on the sheet. The Y-axis 162 is about parallel to a central axis of a vertical portion of the wellbore 102.

An electric submersible pump (ESP) assembly 106 is deployed within the casing 104 and comprises an optional sensor unit 108, an electric motor 110, a motor head 111, a seal unit 112, an electric power cable 113, a pump intake 114, a centrifugal pump 116, and a pump outlet 118 that couples the pump 116 to a production tubing 120. In an embodiment, the ESP assembly 106 may employ hybrid magnetic thrust bearings in several places, for example in the electric motor 110, in the seal unit 112, and/or in the centrifugal pump 116. While not shown in FIG. 1, in an embodiment, the ESP assembly 106 comprises a gas separator that may employ one or more hybrid magnetic thrust bearings. The motor head 111 couples the electric motor 110 to the seal unit 112. The electric power cable 113 may connect to a source of electric power at the surface 103 and to the electric motor 110. The casing 104 is pierced by perforations 140, and reservoir fluid 142 flows through the perforations 140 into the wellbore 102. The fluid 142 flows downstream in an annulus formed between the casing 104 and the ESP assembly 106, is drawn into the pump intake 114, is pumped by the centrifugal pump 116, and is lifted through the production tubing 120 to the wellhead 101 to be produced at the surface 103. The fluid 142 may comprise hydrocarbons such as oil and/or gas. The fluid 142 may comprise water. The fluid 142 may comprise both hydrocarbons and water.

Figure 2A:
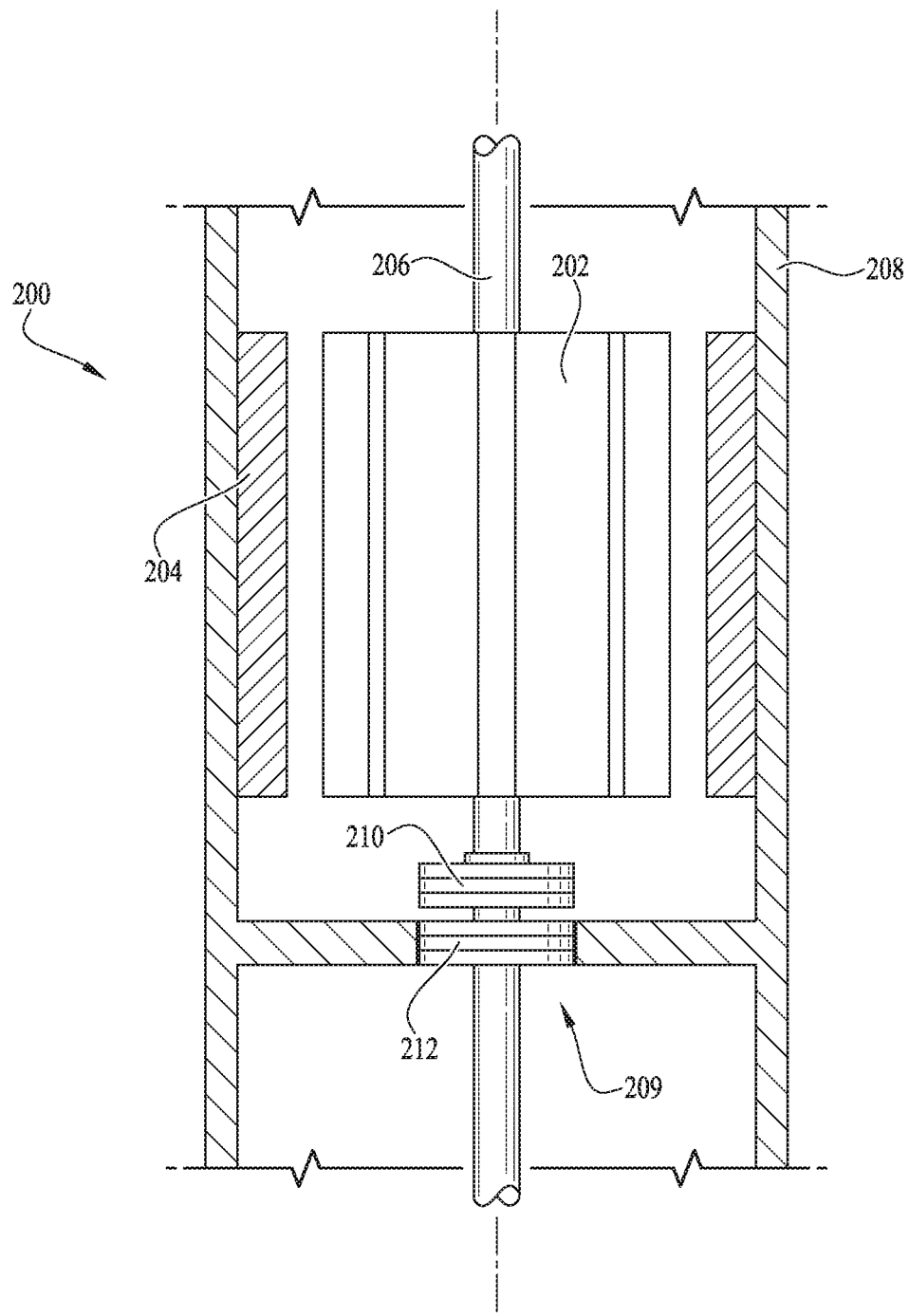
FIG. 2A is an illustration of a rotor of an electric motor supported axially by a hybrid magnetic thrust bearing according to an embodiment of the disclosure.

Turning now to FIG. 2A, an electric motor 200 is supported axially by a hybrid magnetic thrust bearing. The electric motor 200 comprises a rotor 202, a stator 204, a housing 208, and a hybrid magnetic thrust bearing 209. The electric motor 200 may be the electric motor 110 of the ESP assembly 106. The hybrid magnetic thrust bearing 209 comprises a thrust transfer plate 210 and a thrust support plate 212. The thrust transfer plate 210 is coupled to the drive shaft 206 and turns with the drive shaft 206. The thrust support plate 212 is supported by the housing 208. Thrust force associated with weight of the rotor 202 (and possibly thrust force developed by other rotating components of the ESP assembly 106) is transferred to the drive shaft 206, from the drive shaft 206 to the thrust transfer plate 210, from the thrust transfer plate to the thrust support plate 213, and from the thrust support plate 212 to the housing 208.

While a single hybrid magnetic thrust bearing 209 is illustrated in FIG. 2A, in an embodiment, another hybrid magnetic thrust bearing 209 may be located in the electric motor 200 at the top of the motor 200. In this case, the hybrid magnetic thrust bearing 209 would be flipped, with the thrust transfer plate 210 located closest to the rotor 202 and the thrust support plate 212 located away from the rotor 202 (e.g., above the thrust transfer plate). In this alternate embodiment, the rotor 202 would be sandwiched between two hybrid magnetic thrust bearings, one hybrid magnetic thrust bearing disposed to support axial thrust directed downhole (e.g., directed axially downwards parallel to the central axis of the drive shaft 206) and the other hybrid magnetic thrust bearing disposed to support axial thrust directed uphole (e.g., directed axially upwards parallel to the central axis of the drive shaft 206).

The electric motor 110 may be implemented similar to the electric motor 200. In an embodiment, the electric motor 200 (and electric motor 110) may comprise a plurality of rotor and stator stages, whereby to produce more mechanical torque than would be produced by a single rotor and stator pair. In this case, an electric motor 110, 200 comprising a plurality of rotor and stator stages may be associated with a single hybrid magnetic thrust bearing 209 located at a downhole end of the plurality of rotor and stator stages. Alternatively, the plurality of rotor and stator stages may be associated with a single hybrid magnetic thrust bearing located at a downhole end of the plurality of rotor and stator stages and a single hybrid magnetic thrust bearing located at an uphole end of the plurality of rotor and stator stages.

Figure 2B:
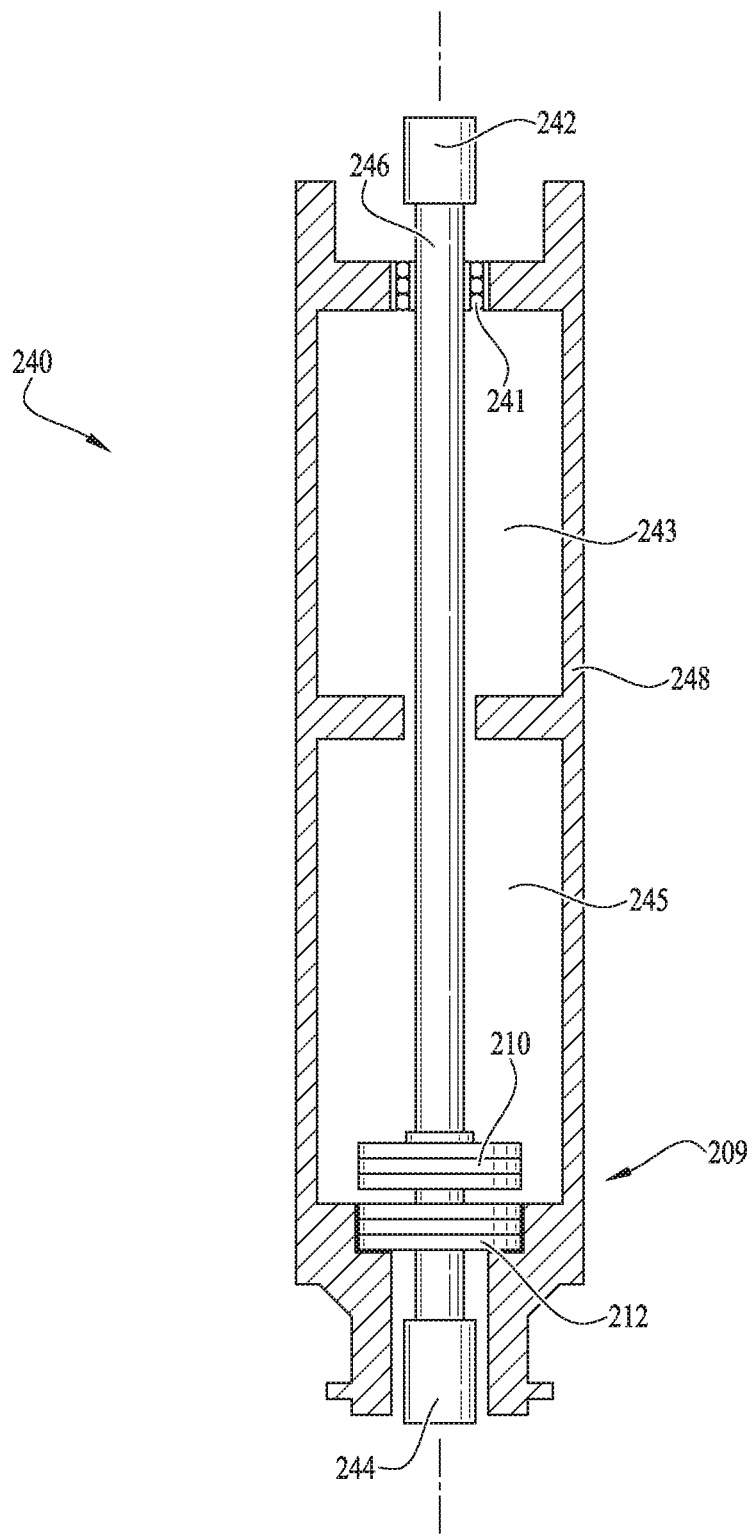
FIG. 2B is an illustration of a drive shaft of a seal unit supported axially by a hybrid magnetic thrust bearing according to an embodiment of the disclosure.

Turning now to FIG. 2B, a seal unit 240 is described. In an embodiment, the seal unit 240 comprises a pump coupling 242, a motor coupling 244, a drive shaft 246, a radial bearing 241, a first chamber 243, a second chamber 245, and a housing 248. The pump coupling 242 mechanically couples the drive shaft 246 to a drive shaft of the centrifugal pump 116, and the motor coupling 244 mechanically couples the drive shaft 246 to the electric motor 110. In an embodiment, the seal unit 240 may be the seal unit 112 of FIG. 1. In an embodiment, the seal unit 240 comprises a hybrid magnetic thrust bearing 209 comprising a thrust transfer plate 210 and a thrust support plate 212. The thrust support plate 212 is retained by the housing 248 and held stationary. The thrust transfer plate 210 is coupled to and hence rotates with the drive shaft 246. Down thrust on the drive shaft 246, transferred from the drive shaft of the centrifugal pump 116, may be supported at least in part by the hybrid magnetic thrust bearing 209, transferring downwards directed thrust from the drive shaft 246 to the housing 248 via the thrust support plate 212. In an embodiment, the seal unit 240 may have more than one hybrid magnetic thrust bearing 209. In an embodiment, the seal unit 240 may have a hybrid magnetic thrust bearing 209 that is located within the seal unit 240 so as to support upthrust forces. In this case, the upthrust hybrid magnetic thrust bearing 209 would be flipped, with the thrust transfer plate 210 located downhole relative to the thrust support plate 212.

Figure 3:
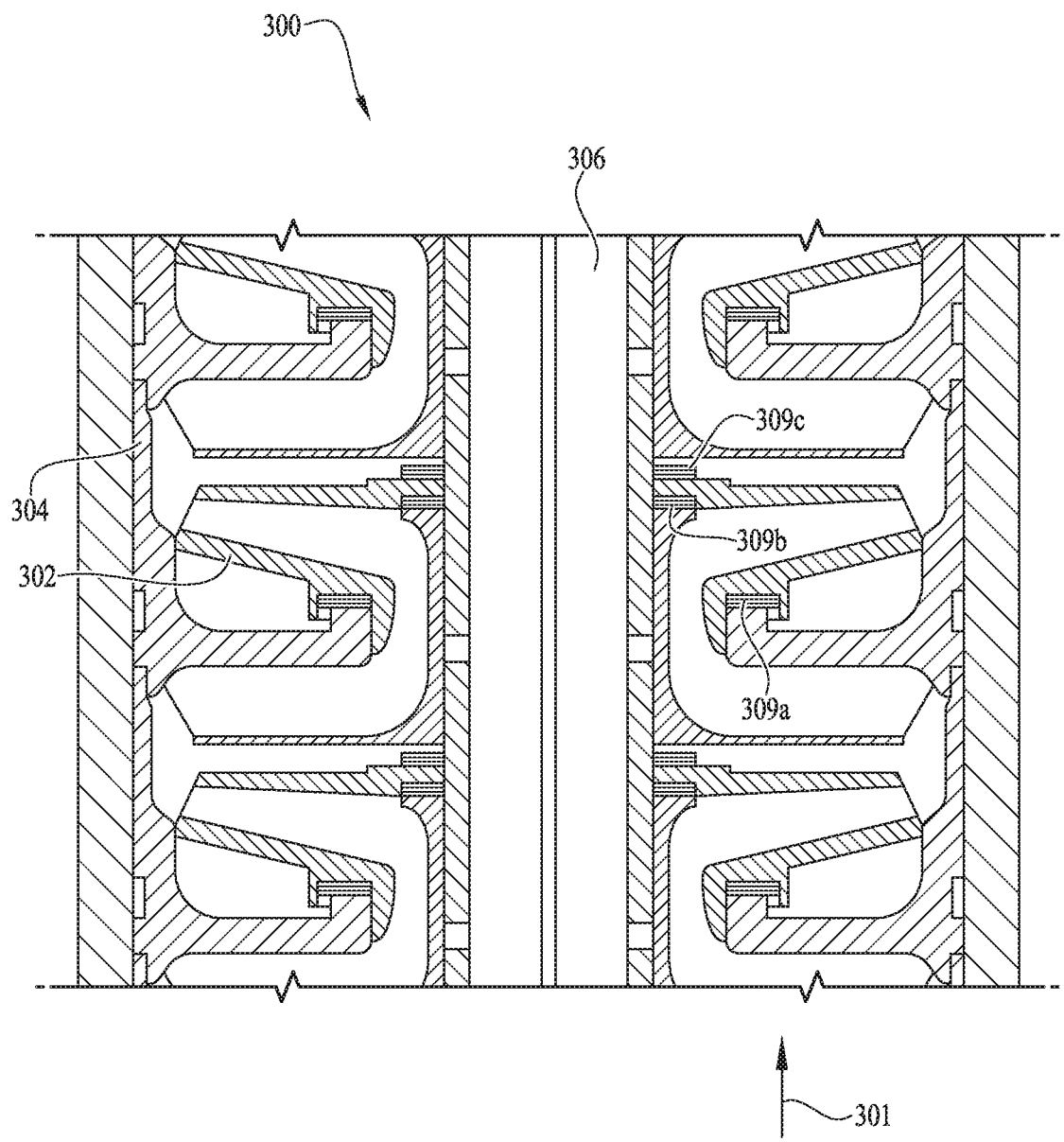
FIG. 3 is an illustration of an impeller of a stage of a centrifugal pump supported axially by a hybrid magnetic thrust bearing according to an embodiment of the disclosure.

Turning now to FIG. 3, is a cross-sectional view of a multi-stage centrifugal pump 300 showing a plurality of hybrid magnetic thrust bearings: a first hybrid magnetic thrust bearing 309a, a second hybrid magnetic thrust bearing 309b, and a third hybrid magnetic thrust bearing 309c. In an embodiment, the multi-stage centrifugal pump 300 may comprise any number of hybrid magnetic thrust bearings 309. The pump comprises a plurality of impellers 302, a plurality of diffusers 304, and a drive shaft 306. The impellers 302 are coupled to the drive shaft 306 and turn with the drive shaft 306. The drive shaft 306 may be turned by the electric motor 110. The impellers 302 provide uplift to fluid 301 in the pump 300. A downwards directed axial thrust associated with the drive shaft 306 and/or the impeller 302 may be transferred to the first hybrid magnetic thrust bearing 309a and to the second hybrid magnetic thrust bearing 309b. The first and second hybrid magnetic thrust bearings 309a, 309b may be configured to transfer downwards directed axial thrust from the drive shaft 306 and/or the impeller 302 to the diffuser 304. An upwards directed axial thrust associated with the drive shaft 306 and/or the impeller 302 may be transferred to the third hybrid magnetic thrust bearing 309c. The third hybrid magnetic thrust bearing 309c may be configured to transfer upwards directed axial thrust from the drive shaft 306 and/or the impeller 302 to the diffuser 304. The centrifugal pump 300 may generate axial thrust directed downhole in a first operating regime and generate axial thrust directed uphole in a second operating regime.

Figure 4A:
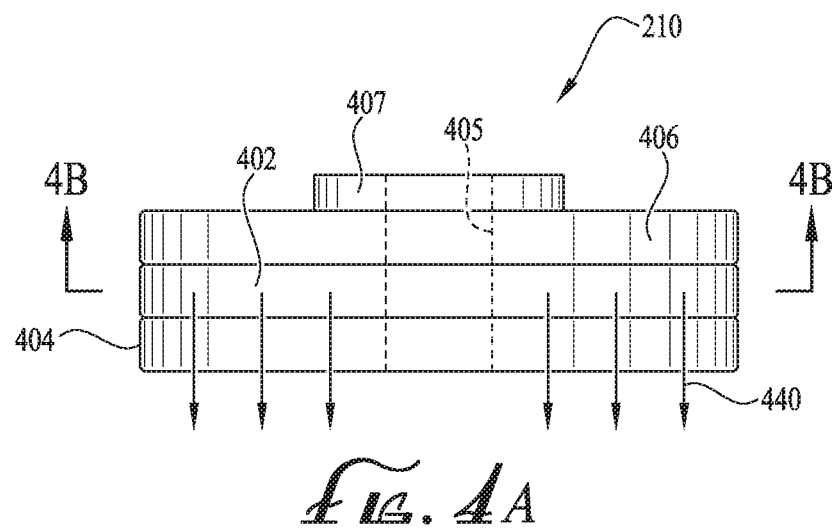
FIG. 4A is an illustration of a thrust transfer plate of a hybrid magnetic thrust bearing according to an embodiment of the disclosure.

Turning now to FIG. 4A, details of the thrust transfer plate 210 are described. In an embodiment, the thrust transfer plate 210 comprises a thrust transfer plate magnetic element 402, a bearing surface 404, and a support plate 406 having a shoulder 407. The thrust transfer plate 210 defines a through-hole 405 to accommodate the drive shaft 206, 306. The shoulder 407 may be used to secure the thrust transfer plate 210 to the drift shaft 206, 246 and to stabilize the thrust transfer plate 210. The magnetic element 402 produces a magnetic field 440.

Figure 4B:
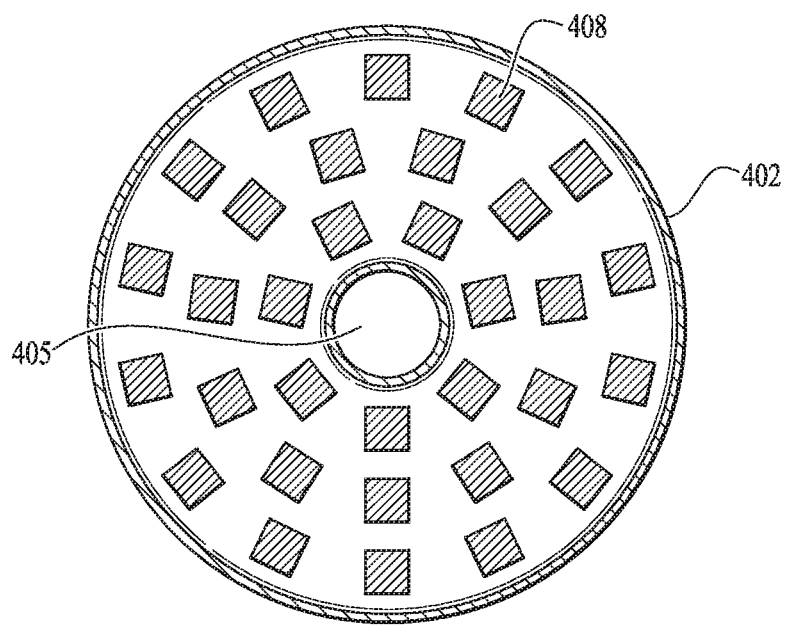
FIG. 4B is a cross-section of a magnetic element of the thrust transfer plate of FIG. 4A according to an embodiment of the disclosure.

Turning now to FIG. 4B, a cross-section of the magnetic element 402 is described. In an embodiment, the magnetic element 402 comprises a plurality of permanent magnets 408. The permanent magnets 408 may be press fit into slots in the magnetic element 402. The permanent magnets 408 may be secured with attachment hardware such as screws, brackets, retaining rings, or other attachment hardware. The permanent magnets 408 may be secured with glue, epoxy, or another adhesive. The permanent magnets 408 are each positioned with their magnetic fields oriented in the same direction, for example with their north magnetic poles directed towards the bearing surface 404 or with their south magnetic poles directed towards the bearing surface 404.

Figure 4C:
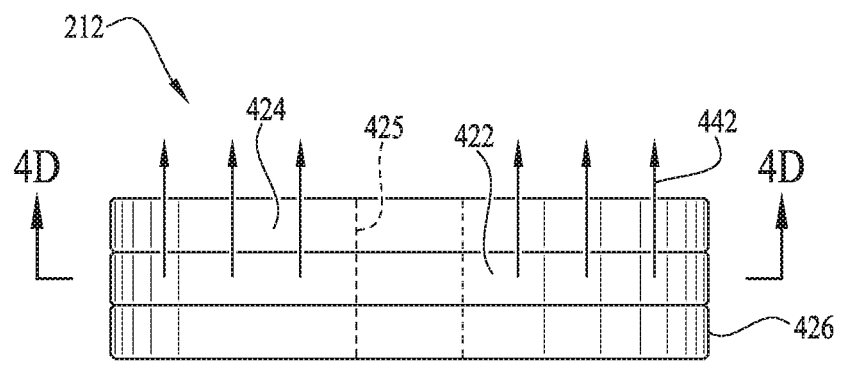
FIG. 4C is an illustration of a thrust support plate of a hybrid magnetic thrust bearing according to an embodiment of the disclosure.

Turning now to FIG. 4C, details of the thrust support plate 212 are described. In an embodiment, the thrust support plate 212 comprises a thrust support plate magnetic element 422, a bearing surface 424, and a support plate 426. The thrust support plate 212 defines a through-hole 425 to accommodate the drive shaft 206, 246. The magnetic element 422 produces a magnetic field 442.

Figure 4D:
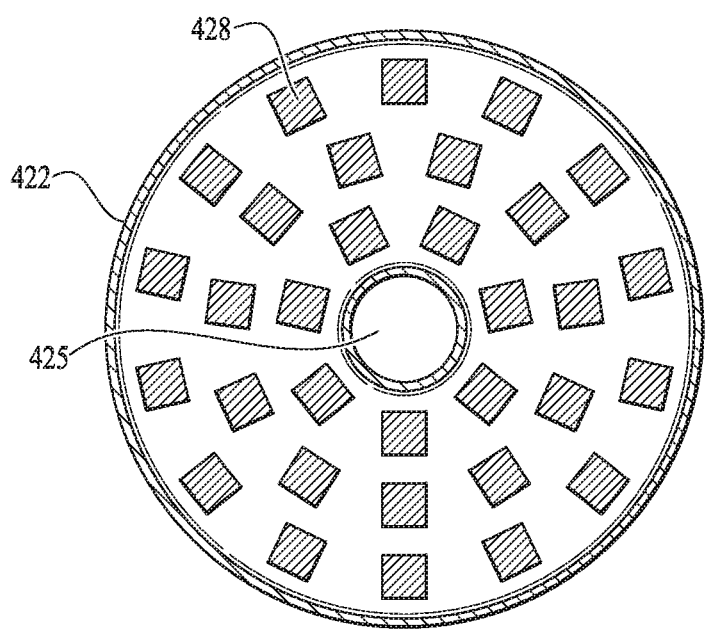
FIG. 4D is a cross-section of a magnetic element of the thrust support plate of FIG. 4C according to an embodiment of the disclosure.

Turning now to FIG. 4D, a cross-section of the magnetic element 422 is described. In an embodiment, the magnetic element 422 comprises a plurality of permanent magnets 428. The permanent magnets 428 may be press fit into slots in the magnetic element 422. The permanent magnets 428 may be secured with attachment hardware such as screws, brackets, retaining rings, or other attachment hardware. The permanent magnets 428 may be secured with glue, epoxy, or another adhesive. The permanent magnets 428 are each positioned with their magnetic fields oriented in the same direction, for example with their north magnetic poles directed toward the bearing surface 424 or with their south magnetic poles directed toward the bearing surface 424. If the north magnetic fields of the permanent magnets 408 are directed toward the bearing surface 404, the north magnetic fields of the permanent magnets 428 are directed toward the bearing surface 424. If the south magnetic fields of the permanent magnets 408 are directed toward the bearing surface 404, the south magnetic fields of the permanent magnets 428 are directed toward the bearing surface 424. In this way, the fields of the permanent magnets 408 are directed contrary to the fields of the permanent magnets 428.

Figure 4E:
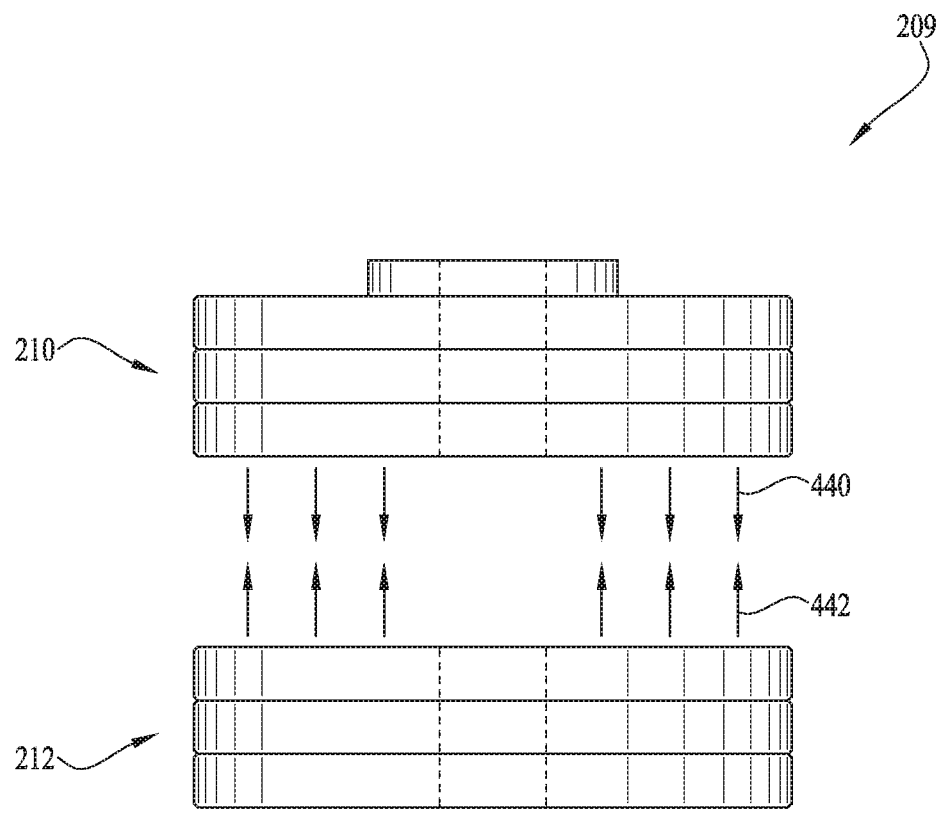
FIG. 4E is an illustration of direction of magnetic fields in a hybrid magnetic thrust bearing according to an embodiment of the disclosure.

Turning now to FIG. 4E, the relationship between magnetic fields 440 produced by the thrust transfer plate 210 and magnetic fields 442 produced by the thrust support plate 212 is discussed. The magnetic fields 440, 442 are directed to oppose each other and to thereby produce a force of opposition between the magnetic elements 402, 422. This force is inversely related to the distance between the magnetic elements 402, 422. As a separation between the thrust transfer plate 210 and the thrust support plate 212 is decreased, the opposing force developed between the magnetic elements 402, 422 increases, and as the separation between the thrust transfer plate 210 and the thrust support plate 212 is increased, the opposing force developed between the magnetic elements 402, 422 decreases.

Figure 4F:
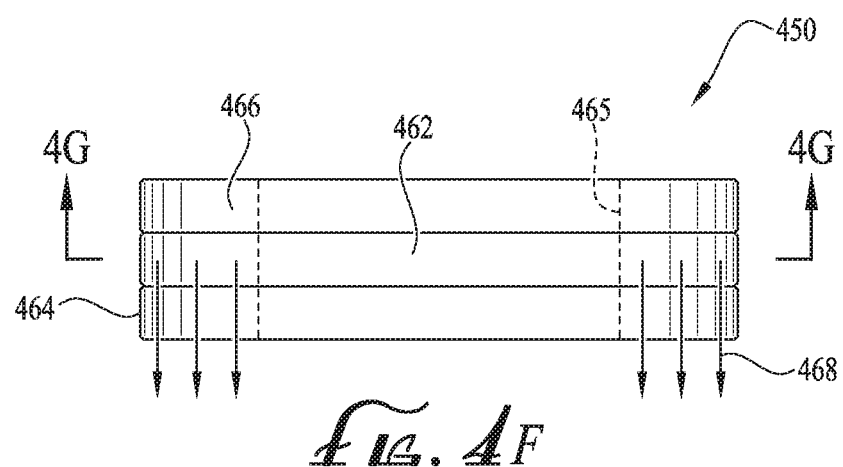
FIG. 4F is an illustration of a thrust transfer plate of a hybrid magnetic thrust bearing according to another embodiment of the disclosure.

Turning now to FIG. 4F, details of a thrust transfer plate 450 are described. In an embodiment, the thrust transfer plate 450 comprises a thrust transfer plate magnetic element 462, a bearing surface 464, and a support plate 466. The thrust transfer plate 450 defines a through-hole 465 to accommodate structure of the impeller 302 and/or diffuser 304 of the centrifugal pump 300. The magnetic element 462 produces a magnetic field 468.

Figure 4G:
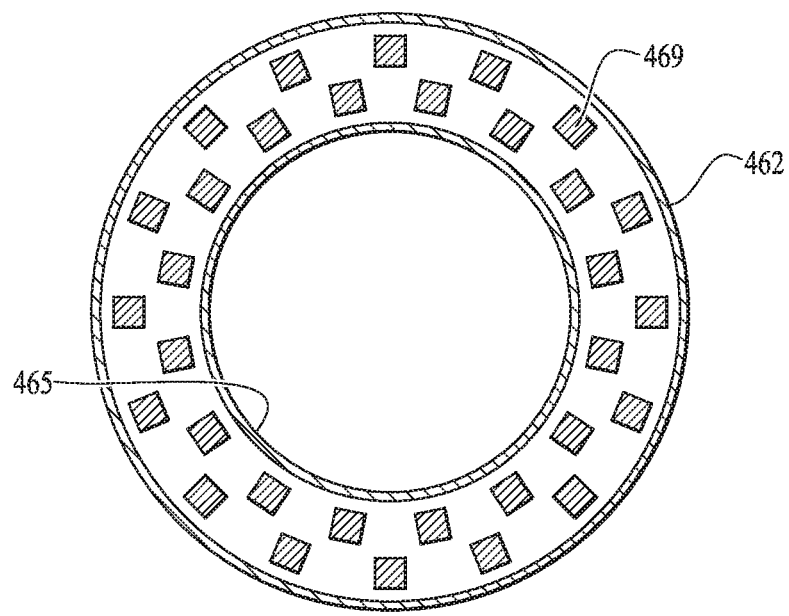
FIG. 4G is a cross-section of a magnetic element of the thrust transfer plate of FIG. 4F according to another embodiment of the disclosure.

Turning now to FIG. 4G, a cross-section of the magnetic element 462 is described. In an embodiment, the magnetic element 462 comprises a plurality of permanent magnets 469. The permanent magnets 469 may be press fit into slots in the magnetic element 462. The permanent magnets 469 may be secured with attachment hardware such as screws, brackets, retaining rings, or other attachment hardware. The permanent magnets 469 may be secured with glue, epoxy, or another adhesive. The permanent magnets 469 are each positioned with their magnetic fields oriented in the same direction, for example with their north magnetic poles directed towards the bearing surface 464 or with their south magnetic poles directed towards the bearing surface 464.

Figure 4H:
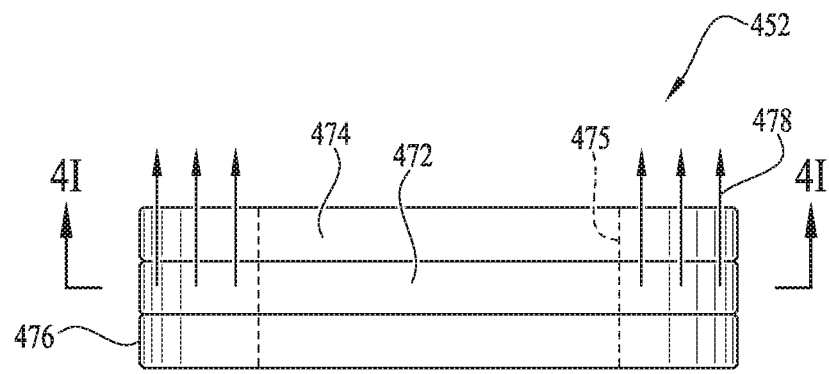
FIG. 4H is an illustration of a thrust support plate of a hybrid magnetic thrust bearing according to another embodiment of the disclosure.

Turning now to FIG. 4H, details of a thrust support plate 452 are described. The hybrid magnetic thrust bearing 309 may comprise the thrust transfer plate 450 and the thrust support plate 452. In an embodiment, the thrust support plate 452 comprises a thrust support plate magnetic element 472, a bearing surface 474, and a support plate 476. The thrust support plate 452 defines a through-hole 475 to accommodate structure of the impeller 302 and/or of the diffuser 304. The magnetic element 472 produces a magnetic field 478.

Figure 4I:
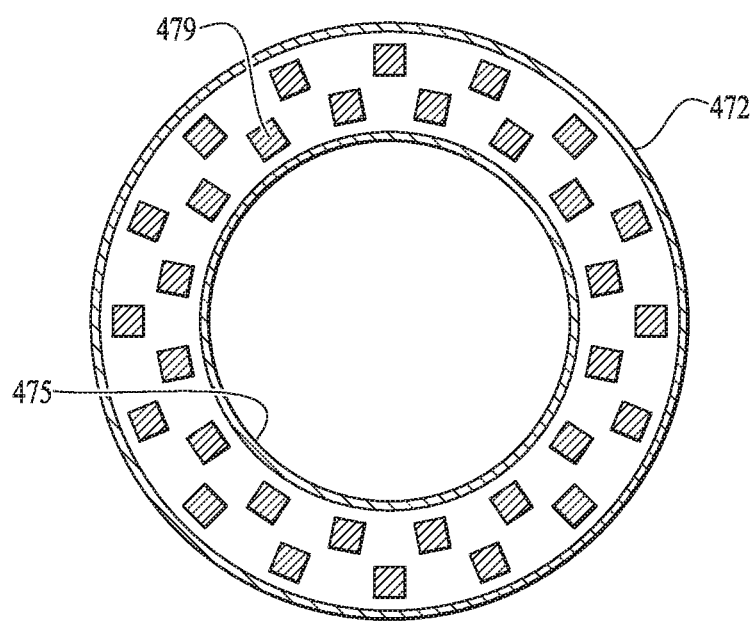
FIG. 4I is a cross-section of a magnetic element of the thrust support plate of FIG. 4H according to another embodiment of the disclosure.

Turning now to FIG. 4I, a cross-section of the magnetic element 472 is described. In an embodiment, the magnetic element 472 comprises a plurality of permanent magnets 479. The permanent magnets 479 may be press fit into slots in the magnetic element 472. The permanent magnets 479 may be secured with attachment hardware such as screws, brackets, retaining rings, or other attachment hardware. The permanent magnets 479 may be secured with glue, epoxy, or another adhesive. The permanent magnets 479 are each positioned with their magnetic fields oriented in the same direction, for example with their north magnetic poles directed toward the bearing surface 474 or with their south magnetic poles directed toward the bearing surface 474. If the north magnetic fields of the permanent magnets 469 are directed toward the bearing surface 464, the north magnetic fields of the permanent magnets 479 are directed toward the bearing surface 474. If the south magnetic fields of the permanent magnets 469 are directed toward the bearing surface 464, the south magnetic fields of the permanent magnets 479 are directed toward the bearing surface 474. In this way, the fields of the permanent magnets 4469 are directed contrary to the fields of the permanent magnets 479.

Figure 4J:
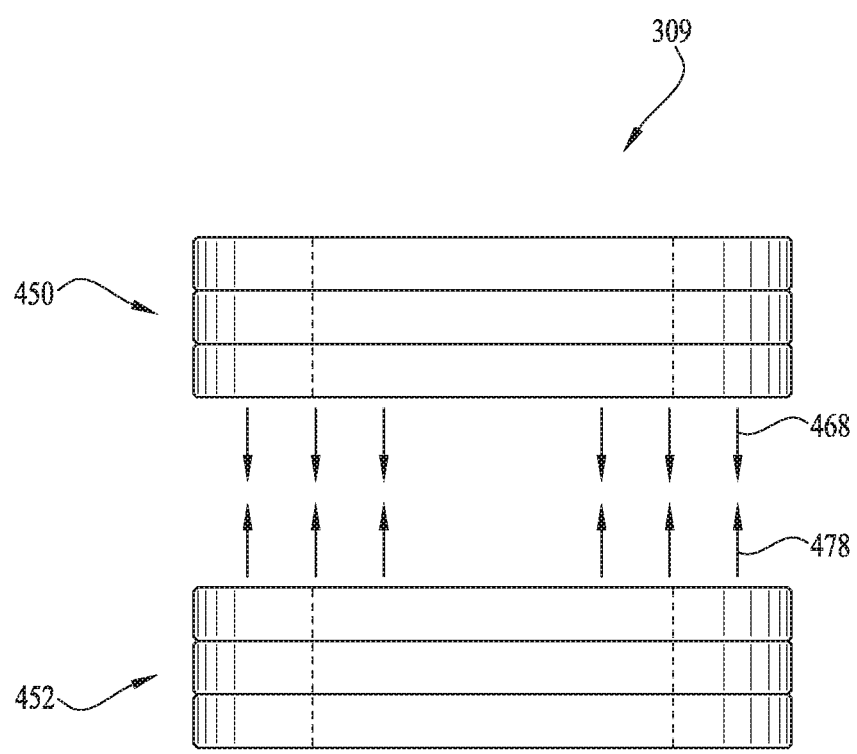
FIG. 4J is an illustration of direction of magnetic fields in a hybrid magnetic thrust bearing according to another embodiment of the disclosure.

Turning now to FIG. 4J, the relationship between magnetic fields 468 produced by the thrust transfer plate 450 and magnetic fields 478 produced by the thrust support plate 452 is discussed. The magnetic fields 468, 478 are directed to oppose each other and to thereby produce a force of opposition between the magnetic elements 462, 472. This force is inversely related to the distance between the magnetic elements 462, 472. As a separation between the thrust transfer plate 450 and the thrust support plate 452 is decreased, the opposing force developed between the magnetic elements 462, 472 increases, and as the separation between the thrust transfer plate 450 and the thrust support plate 452 is increased, the opposing force developed between the magnetic elements 462, 472 decreases.

With reference now to FIG. 4A, FIG. 4B, FIG. 4C, FIG. 4D, FIG. 4E, FIG. 4F, FIG. 4G, FIG. 4H, FIG. 4I, and FIG. 4J, in an embodiment the permanent magnets 408, 428, 469, 479 are rare earth permanent magnets. In an embodiment, the permanent magnets 408, 428. 469. 479 are samarium-cobalt rare earth permanent magnets. In an embodiment, the permanent magnets 408, 428, 469, 479 are neodymium rare earth permanent magnets. Samarium-cobalt rare earth magnets may retain desirable magnetic properties better than neodymium rare earth magnets in a high temperature downhole environment. Neodymium rare earth magnets may provide higher magnetic force than samarium-cobalt rare earth magnets when they are used in a moderate temperature downhole environment. The permanent magnets 408, 428, 469, 479 produce a substantially constant magnetic field strength and may be referred to as passive magnets in contrast to other magnetic devices (e.g., an electro magnet) that may produce a controllable magnetic field strength or where the position of the magnets may be controlled by a feedback control loop (e.g., active control system). For this reason, in some contexts, the hybrid magnetic thrust bearings taught herein may be referred to as passive hybrid magnetic thrust bearings.

The hybrid magnetic thrust bearing 209 (or 309) supports axial thrust with fluid film mechanical force operating between the bearing surfaces 404, 424 (or 464, 474) augmented by magnetic forces operating between the opposing magnetic fields 440, 442 (or 468, 478). The contribution of the magnetic forces may permit some of the tolerances of the bearing surfaces 404, 424 (or 464, 474) to be relaxed, whereby manufacturing costs may be reduced. Additionally, the contribution of the magnetic forces to the fluid film mechanical forces in the hybrid magnetic thrust bearing 209 (or 309) may promote maintaining a greater separation between the bearing surfaces 404, 424 (or 464, 474) which can reduce bearing surface wear in the presence of abrasive particles.

The hybrid magnetic thrust bearing 209, 309 can be installed with a first orientation (in the orientation illustrated in FIG. 4E, FIG. 4J in the ESP assembly 106 to support thrust force directed axially downwards, for example thrust force transferred by the drive shaft 206, 246, 306 directed axially downwards. When the hybrid magnetic thrust bearing 209, 309 is installed in the ESP assembly 106 (in the electric motor 110, in the seal unit 112, in the centrifugal pump 116) in the first orientation, the hybrid magnetic thrust bearing 209, 309 may be said to exert magnetic force on a rotating component (e.g., the drive shaft 206, 246, 306, the rotor 202, or the impeller 302) directed axially upwards parallel to the central axis of the rotating component and to exert fluid film mechanical force on the rotating component directed axially upwards parallel to the central axis of the rotating component (e.g., the magnetic force augments the fluid film mechanical force). The rotating component can be said to be axially supported by magnetic force applied by the magnetic elements 402, 422, 462, 472 (e.g., magnetic force developed by the opposing magnetic fields 440, 442, 468, 478 repelling each other) and by fluid film force applied by the thrust transfer plate 210, 450 and by the thrust support plate 212, 452 of the hybrid magnetic thrust bearing 209, 309 disposed in the first orientation.

The hybrid magnetic thrust bearing 209, 309 can be installed with a second orientation (the orientation of FIG. 4E or FIG. 4J rotated 180 degrees—e.g., 'flipped') in the ESP assembly 106 to support thrust force directed axially upwards, for example thrust force transferred by the drive shaft 206, 246, 306 directed axially upwards. When the hybrid magnetic thrust bearing 209, 309 is installed in the ESP assembly 106 (in the electric motor 110, in the seal unit 112, in the centrifugal pump 116) in the second orientation, the hybrid magnetic thrust bearing 209, 309 may be said to exert magnetic force on a rotating component (e.g., the drive shaft 206, 246, 306, the rotor 202, or the impeller 302) directed axially downwards parallel to the central axis of the rotating component and to exert fluid film mechanical force on the rotating component directed axially downwards parallel to the central axis of the rotating component (e.g., the magnetic force augments the fluid film mechanical force). The rotating component can be said to be axially supported by magnetic force applied by the magnetic elements 402, 422, 462, 472 (e.g., magnetic force developed by the opposing magnetic fields 440, 442, 468, 478 repelling each other) and by fluid film force applied by the thrust transfer plate 210, 450 and by the thrust support plate 212, 452 of the hybrid magnetic thrust bearing 209, 309 disposed in the second orientation.

In an embodiment, a separation between the bearing surfaces 404, 424, 464, 474 is about 3 mils to 10 mils. In another embodiment, however, the separation between the bearing surfaces 404, 424, 464, 474 may have a value outside the range of 3 mils to 10 mils. In an embodiment, the separation between the bearing surfaces 404, 424, 464, 474 is greater than the separation maintained in conventional thrust bearings. The surface roughness of the bearing surfaces 404, 424, 464, 474 may be about 20 millionths of an inch of surface variation, while conventional thrust bearings may have a surface roughness of about 10 millionths of an inch in surface variation. In an embodiment, the surface finish of the bearing surfaces 404, 424, 464, 474 have a roughness of between 8 micro inches and 22 micro inches.

Figure 5A:
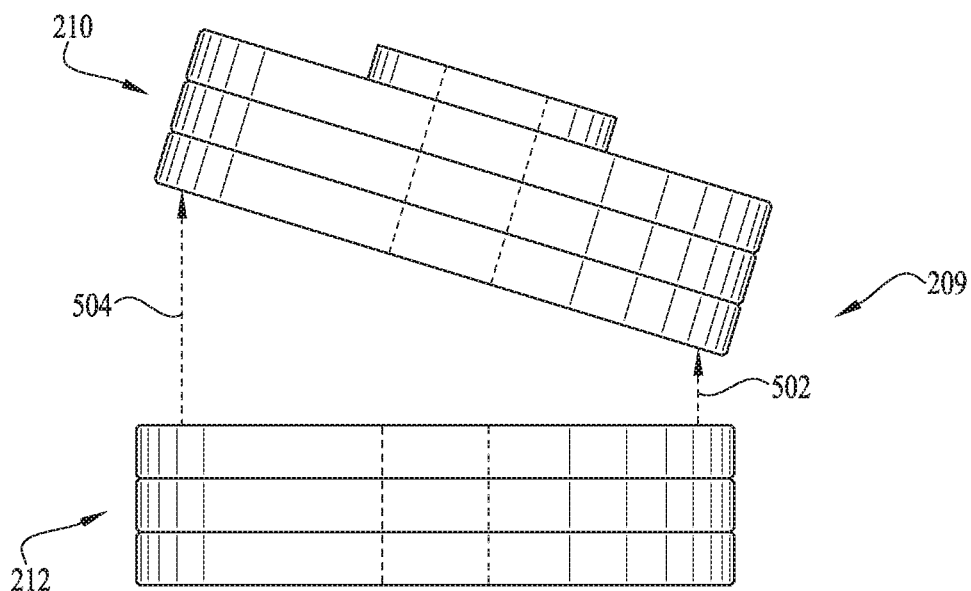
FIG. 5A is an illustration of a first alignment of bearing surfaces of a hybrid magnetic thrust bearing according to an embodiment of the disclosure.
Figure 5B:
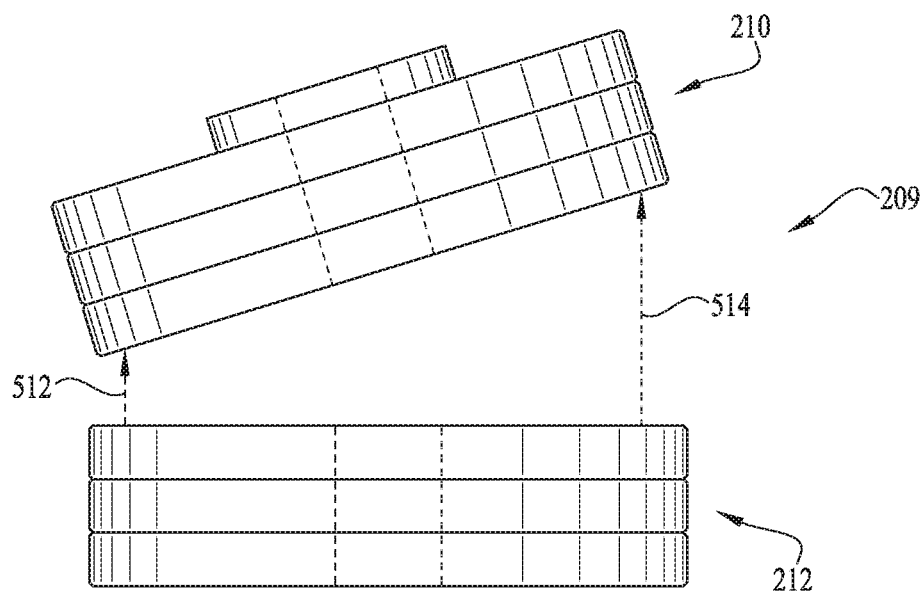
FIG. 5B is an illustration of a second alignment of bearing surfaces of a hybrid magnetic thrust bearing according to an embodiment of the disclosure.

Turning now to FIG. 5A and FIG. 5B, further details of the hybrid magnetic thrust bearing 209 are described. It is noted that the same observations here made with reference to the hybrid magnetic thrust bearing 209 apply also to the hybrid magnetic thrust bearing 309. In an embodiment, the magnetic operation of the hybrid magnetic thrust bearing 209 may contribute to stabilizing the bearing 209 and deterring or mitigating a wobble that may occur. In FIG. 5A, the hybrid magnetic bearing 209 is illustrated as having raised a left side of the thrust transfer plate 210 relative to the thrust support plate 212, and having lowered a right side of the thrust transfer plate 210 relative to the thrust support plate 212. Because the right sides of the plates 210, 212 are closer together, the magnetic force 502 applied to the thrust transfer plate 210 at the right side is increased, and because the left sides of the plates 210, 212 are further apart, the magnetic force 504 applied to the thrust transfer plate 210 at the left side is reduced. In FIG. 5B, the hybrid magnetic bearing 209 is illustrated as having raised a right side of the thrust transfer plate 210 relative to the thrust support plate 212, and having lowered a left side of the thrust transfer plate 210 relative to the thrust support plate 212. Because the left sides of the plates 210, 212 are closer together, the magnetic force 512 applied to the thrust transfer plate 210 at the left side is increased, and because the right side of the plates 210, 212 are further apart, the magnetic force 514 applied to the thrust transfer plate 210 at the right side is reduced. These imbalanced forces tend to urge the plates 210, 212 to return to a steady state, level orientation. It is understood that the tilting of the plates 210, 212 relative to each other depicted in FIG. 5A and FIG. 5B is greatly exaggerated to illustrate this stabilizing feature.

In traditional thrust bearings that operate solely using fluid film mechanical forces, wear of bearing surfaces can result in oscillatory vibration that may establish an eccentric gap between the bearing surfaces. This eccentric gap promotes yet more wear of the bearing surface. The eccentric gap increases the infiltration of particles into the gap which disrupts operation of the thrust supporting fluid film mechanical forces and further accelerates wear of the bearing surfaces. The thrust supporting force of the magnetic field interactions of the hybrid magnetic thrust bearings 209, 309 taught herein, by contrast, act so as to offset and compensate against uneven wear. As uneven wear occurs on a bearing surface, the bearing surfaces at the point of wear tend to bring the magnetic elements closer together, increasing the opposing magnetic forces, thereby offsetting the lost fluid film mechanical force at the point of wear. This can promote more even wear and avoidance of the oscillatory vibration mentioned above, thereby reducing the rate of wear of the bearing surfaces. The hybrid magnetic thrust bearings 209, 309 taught herein may counteract oscillatory vibrations that sometimes develop in conventional thrust bearings as a result of eccentric wear and may in part correct any eccentric wear which may develop in the hybrid magnetic thrust bearings 209, 309.

Figure 6:
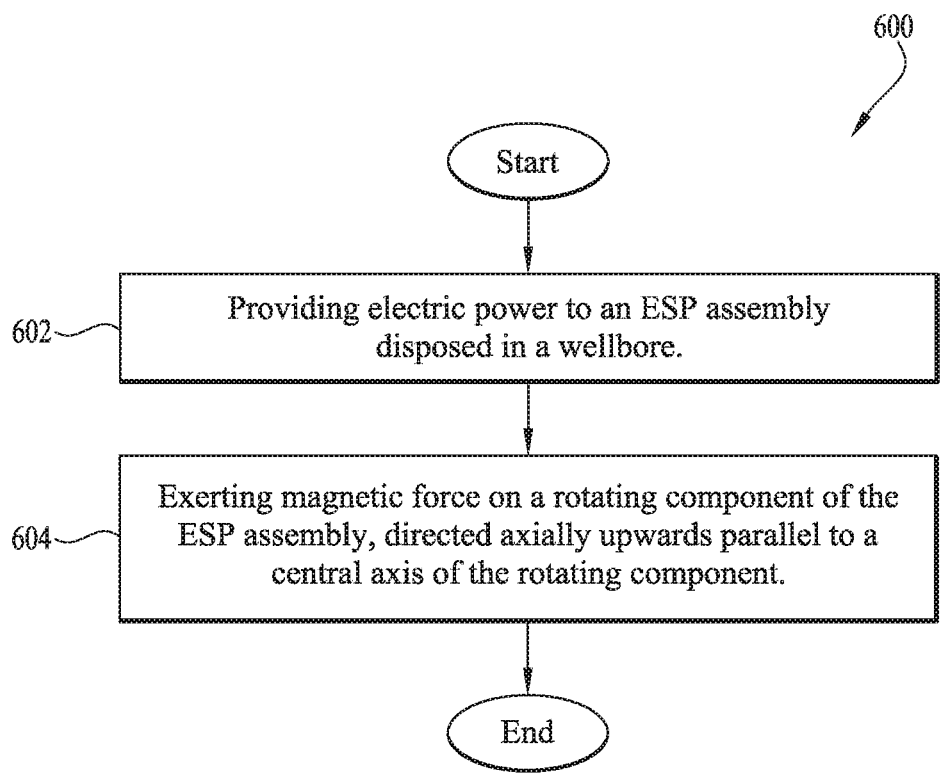
FIG. 6 is a flow chart of a method according to an embodiment of the disclosure.

Turning now to FIG. 6, a method 600 is described. In an embodiment, method 600 is a method of operating in an electric submersible pump (ESP) assembly. At block 602, the method 600 comprises providing electric power to an ESP assembly disposed in a wellbore. At block 604, the method 600 comprises exerting magnetic force on a rotating component of the ESP assembly directed axially upwards parallel to a central axis of the rotating component. In an embodiment, the method 600 comprises exerting fluid film force on the rotating component directed axially upwards parallel to the central axis of the rotating component. In an embodiment, the method 600 comprises exerting magnetic force on the rotating component directed axially downwards parallel to the central axis of the rotating component.

Turning now to FIG. 7, a method 700 is described. In an embodiment, the method 700 is a method of lifting fluid in a wellbore. At block 702, the method 700 comprises providing electric power to an electric motor of an electric submersible pump (ESP) assembly, wherein the electric motor is supported axially at least in part by at least one hybrid magnetic thrust bearing disposed inside the electric motor. In an embodiment, the electric motor is axially supported by magnetic force applied by a magnetic element of the at least one hybrid magnetic thrust bearing disposed inside the electric motor and by fluid film force applied by a thrust transfer plate and a thrust support plate of the at least one hybrid magnetic thrust bearing disposed inside the electric motor interacting with a fluid provided inside the electric motor. In an embodiment, the electric motor comprises a plurality of rotor and stator stages.

At block 704, the method 700 comprises providing mechanical torque by the electric motor to a centrifugal pump of the ESP assembly, wherein a drive shaft of the centrifugal pump is supported axially at least in part by at least one hybrid magnetic thrust bearing disposed inside the centrifugal pump. In an embodiment, the centrifugal pump comprises a plurality of pump stages. In an embodiment, the drive shaft of the centrifugal pump is axially supported by magnetic force applied by a magnetic element of the at least one hybrid magnetic thrust bearing disposed inside the centrifugal pump and by fluid film force applied by a thrust transfer plate and a thrust support plate of the at least one hybrid magnetic thrust bearing disposed inside the centrifugal pump interacting with the fluid. The magnetic element comprises a plurality of permanent magnets, for example a plurality of rare earth permanent magnets or other kind of permanent magnets. In an embodiment, a drive shaft of a seal unit of the ESP assembly is axially supported at least in part by at least one hybrid magnetic thrust bearing disposed inside the seal unit, wherein the drive shaft of the seal unit provides the mechanical torque from the electric motor to the drive shaft of the centrifugal pump.

At block 706, the method 700 comprises lifting a fluid in a wellbore by the centrifugal pump. The fluid may comprise one or more hydrocarbons. The fluid may comprise water. The fluid may comprise a mixture of oil and gas. The fluid may comprise a mixture of hydrocarbons and water. The fluid may comprise a mixture of oil, gas, and water.

ADDITIONAL DISCLOSURE

The following are non-limiting, specific embodiments in accordance with the present disclosure:

A first embodiment, which is an electric submersible pump (ESP) assembly, comprising an electric motor, a centrifugal pump, and a hybrid magnetic thrust bearing, wherein the hybrid magnetic thrust bearing is disposed inside the electric motor or disposed inside the centrifugal pump.

A second embodiment, which is the ESP assembly of the first embodiment, wherein the hybrid magnetic thrust bearing comprises a thrust transfer plate that is coupled to a drive shaft of the ESP assembly and a thrust support plate that is coupled to a housing of the ESP assembly, the thrust transfer plate comprises a thrust transfer plate magnetic element, the thrust support plate comprises a thrust support plate magnetic element, and a magnetic field of the thrust transfer plate magnetic element is directed opposite to a magnetic field of the thrust support plate magnetic element.

A third embodiment, which is the ESP assembly of the second embodiment, wherein the thrust transfer plate magnetic element comprises a plurality of permanent magnets and the thrust support plate magnetic element comprises a plurality of permanent magnets.

A fourth embodiment, which is the ESP assembly of the third embodiment, wherein the permanent magnets of both the thrust transfer plate magnetic element and the thrust support plate magnetic element are rare earth permanent magnets.

A fifth embodiment, which is the ESP assembly of the fourth embodiment, wherein the rare earth permanent magnets comprise samarium-cobalt rare earth permanent magnets or neodymium rare earth permanent magnets.

A sixth embodiment, which is the ESP assembly of any of the first, the second, the third, the fourth, or the fifth embodiment, further comprising a seal unit located between the electric motor and the centrifugal pump, wherein the seal unit comprises at least one hybrid magnetic thrust bearing.

A seventh embodiment, which is the ESP assembly of the sixth embodiment, wherein the seal unit comprises at least one hybrid magnetic thrust bearing disposed to support downward thrust of a drive shaft of the seal unit and at least one hybrid magnetic thrust bearing disposed to support upward thrust of the drive shaft of the seal unit.

An eighth embodiment, which is the ESP assembly of any of the first, the second, the third, the fourth, the fifth, the sixth, or the seventh embodiment, wherein the hybrid magnetic thrust bearing is disposed in the electric motor.

A ninth embodiment, which is the ESP assembly of any of the first, the second, the third, the fourth, the fifth, the sixth, the seventh, or the eighth embodiment, wherein the hybrid magnetic thrust bearing is disposed in the centrifugal pump.

A tenth embodiment, which is a method of operating an electric submersible pump (ESP) assembly, comprising providing electric power to an ESP assembly disposed in a wellbore and exerting magnetic force on a rotating component of the ESP assembly directed axially upwards parallel to a central axis of the rotating component.

An eleventh embodiment, which is the method of the tenth embodiment, comprising exerting fluid film force on the rotating component directed axially upwards parallel to the central axis of the rotating component.

A twelfth embodiment, which is the method of the eleventh embodiment, comprising exerting magnetic force on the rotating component directed axially downwards parallel to the central axis of the rotating component.

A thirteenth embodiment, which is the method of lifting fluid in a wellbore, comprising providing electric power to an electric motor of an electric submersible pump (ESP) assembly, wherein the electric motor is supported axially at least in part by at least one hybrid magnetic thrust bearing disposed inside the electric motor, providing mechanical torque by the electric motor to a centrifugal pump of the ESP assembly, wherein a drive shaft of the centrifugal pump is supported axially at least in part by at least one hybrid magnetic thrust bearing disposed inside the centrifugal pump, and lifting a fluid in a wellbore by the centrifugal pump.

A fourteenth embodiment, which is the method of the thirteenth embodiment, wherein the fluid lifted in the wellbore is a hydrocarbon or water.

A fifteenth embodiment, which is the method of the thirteenth or the fourteenth embodiment, wherein the drive shaft of the centrifugal pump is axially supported by magnetic force applied by a magnetic element of the at least one hybrid magnetic thrust bearing disposed inside the centrifugal pump and by fluid film force applied by a thrust transfer plate and a thrust support plate of the at least one hybrid magnetic thrust bearing disposed inside the centrifugal pump interacting with the fluid.

A sixteenth embodiment, which is the method of the fifteenth embodiment, wherein the magnetic element comprises a plurality of permanent magnets.

A seventeenth embodiment, which is the method of any of the thirteenth, the fourteenth, the fifteenth, or the sixteenth embodiment, wherein a drive shaft of a seal unit of the ESP assembly is axially supported at least in part by at least one hybrid magnetic thrust bearing disposed inside the seal unit, wherein the drive shaft of the seal unit provides the mechanical torque from the electric motor to the drive shaft of the centrifugal pump.

An eighteenth embodiment, which is the method of any of the thirteenth, the fourteenth, the fifteenth, the sixteenth, or the seventeenth embodiment, wherein the electric motor is axially supported by magnetic force applied by a magnetic element of the at least one hybrid magnetic thrust bearing disposed inside the electric motor and by fluid film force applied by a thrust transfer plate and a thrust support plate of the at least one hybrid magnetic thrust bearing disposed inside the electric motor interacting with a fluid provided inside the electric motor.

A nineteenth embodiment, which is the method of any of the thirteenth, the fourteenth, the fifteenth, the sixteenth, the seventeenth, or the eighteenth embodiment, wherein the electric motor comprises a plurality of rotor and stator stages.

A twentieth embodiment, which is the method of any of the thirteenth, the fourteenth, the fifteenth, the sixteenth, the seventeenth, the eighteenth, or the nineteenth embodiment, wherein the centrifugal pump comprises a plurality of pump stages.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An electric submersible pump (ESP) assembly, comprising:
    an electric motor; and
    a centrifugal pump comprising a drive shaft configured to receive power from the electric motor, a plurality of impellers coupled to the drive shaft, a plurality of diffusers, and a plurality of hybrid magnetic thrust bearings located between at least some of the impellers and diffusers, wherein each of the hybrid magnetic thrust bearings comprises a thrust transfer plate coupled to the drive shaft and a thrust support plate, wherein the thrust transfer plate comprises a thrust transfer plate magnetic element and a first bearing surface having a surface roughness in a range of from equal to or greater than 14 millionths of an inch to equal to or less than 22 millionths of an inch, and wherein the thrust support plate comprises a thrust support plate magnetic element and a second bearing surface having a surface roughness in a range of from equal to or greater than 14 millionths of an inch to equal to or less than 22 millionths of an inch.

2. The ESP assembly of claim 1, wherein each of the thrust transfer plates of the hybrid magnetic thrust bearings of the centrifugal pump is coupled to one of the impellers, each of the thrust support plates of the hybrid magnetic thrust bearings of the centrifugal pump is coupled to one of the diffusers, and a magnetic field of each of the thrust transfer plate magnetic elements is directed opposite to a magnetic field of the mated thrust support plate magnetic elements.

3. The ESP assembly of claim 2, wherein the thrust transfer plate magnetic element comprises a plurality of permanent magnets and the thrust support plate magnetic element comprises a plurality of permanent magnets.

4. The ESP assembly of claim 3, wherein the permanent magnets of both the thrust transfer plate magnetic element and the thrust support plate magnetic element are rare earth permanent magnets.

5. The ESP assembly of claim 4, wherein the rare earth permanent magnets comprise samarium-cobalt rare earth permanent magnets or neodymium rare earth permanent magnets.

6. The ESP assembly of claim 1, further comprising a seal unit located between the electric motor and the centrifugal pump, wherein the seal unit comprises a first hybrid magnetic thrust bearing.

7. The ESP assembly of claim 6, wherein the seal unit comprises a second hybrid magnetic thrust bearing, the first hybrid magnetic thrust bearing is disposed to support downward thrust of a drive shaft of the seal unit and the second hybrid magnetic thrust bearing is disposed to support upward thrust of the drive shaft of the seal unit.

8. The ESP assembly of claim 1, further comprising a gas separator located upstream of the centrifugal pump, wherein the gas separator comprises a hybrid magnetic thrust bearing.

9. The ESP assembly of claim 1, wherein the electric motor comprises a hybrid magnetic thrust bearing.

10. The ESP assembly of claim 1, wherein each of the thrust transfer plates has a surface roughness of about 20 millionths of an inch and each of the thrust support plates has a surface roughness of about 20 millionths of an inch.

11. A method of operating an electric submersible pump (ESP) assembly, comprising:
    providing electric power to an ESP assembly disposed in a wellbore;
    exerting magnetic force on a thrust transfer plate of a first hybrid magnetic thrust bearing by a thrust support plate of the first hybrid magnetic thrust bearing directed axially upwards parallel to a central axis of an impeller of a centrifugal pump of the ESP assembly, wherein the first hybrid magnetic thrust bearing is positioned between the impeller and a diffuser of the centrifugal pump located upstream of the impeller; and
    exerting fluid film force on the thrust transfer plate of the first hybrid magnetic thrust bearing directed axially upwards parallel to the central axis of the impeller, wherein the bearing surface of the thrust transfer plate of the first hybrid magnetic thrust bearing has a surface roughness in a range of from equal to or greater than 14 millionths of an inch to equal to or less than 22 millionths of an inch and the bearing surface of the thrust support plate of the first hybrid magnetic thrust bearing has a surface roughness in a range of from equal to or greater than 14 millionths of an inch to equal to or less than 22 millionths of an inch.

12. The method of claim 11, comprising exerting magnetic force on a thrust support plate of a second hybrid magnetic thrust bearing by a thrust transfer plate of the second hybrid magnetic thrust bearing directed axially downwards parallel to the central axis of the impeller, wherein the second hybrid magnetic thrust bearing is positioned between the impeller and a second diffuser of the centrifugal pump located downstream of the impeller.

13. A method of lifting fluid in a wellbore, comprising:
    providing electric power to an electric motor of an electric submersible pump (ESP) assembly, wherein the electric motor is supported axially at least in part by at least one hybrid magnetic thrust bearing disposed inside the electric motor, wherein each of the at least one hybrid magnetic thrust bearing comprises a thrust transfer plate coupled to the drive shaft and a thrust support plate, wherein the thrust transfer plate comprises a thrust transfer plate magnetic element and a first bearing surface having a surface roughness in a range of from equal to or greater than 14 millionths of an inch to equal to or less than 22 millionths of an inch, and wherein the thrust support plate comprises a thrust support plate magnetic element and a second bearing surface having a surface roughness in a range of from equal to or greater than 14 millionths of an inch to equal to or less than 22 millionths of an inch;

providing mechanical torque by the electric motor to a centrifugal pump of the ESP assembly, wherein an impeller of the centrifugal pump is supported axially at least in part by another hybrid magnetic thrust bearing disposed inside the centrifugal pump between the impeller and a diffuser located upstream of the impeller, wherein the other hybrid magnetic thrust bearing disposed inside the centrifugal pump comprises a thrust transfer plate coupled to a drive shaft of the centrifugal pump and a thrust support plate, wherein the thrust transfer plate comprises a thrust transfer plate magnetic element and a third bearing surface having a surface roughness in a range of from equal to or greater than 14 millionths of an inch to equal to or less than 22 millionths of an inch, and wherein the thrust support plate comprises a thrust support plate magnetic element and a fourth bearing surface having a surface roughness in a range of from equal to or greater than 14 millionths of an inch to equal to or less than 22 millionths of an inch; and lifting a fluid in the wellbore by the centrifugal pump.

14. The method of claim 13, wherein the fluid lifted in the wellbore comprises water, a hydrocarbon, a mixture of hydrocarbons and water, or a mixture of oil, gas, and water.

15. The method of claim 13, wherein the impeller is axially supported in part by fluid film force applied by the thrust transfer plate and the thrust support plate of the other hybrid magnetic thrust bearing.

16. The method of claim 13, wherein the thrust transfer plate and the thrust support plate of the at least one hybrid magnetic thrust bearing disposed inside the electric motor comprise a plurality of permanent magnets.

17. The method of claim 13, wherein a drive shaft of a seal unit of the ESP assembly is axially supported at least in part by at least one hybrid magnetic thrust bearing disposed inside the seal unit, wherein each of the hybrid magnetic thrust bearings disposed inside the seal unit comprises a thrust transfer plate coupled to the drive shaft of the seal unit and a thrust support plate, wherein the thrust transfer plate comprises a thrust transfer plate magnetic element and a first bearing surface having a surface roughness in a range of from equal to or greater than 14 millionths of an inch to equal to or less than 22 millionths of an inch, and wherein the thrust support plate comprises a thrust support plate magnetic element and a second bearing surface having a surface roughness in a range of from equal to or greater than 14 millionths of an inch to equal to or less than 22 millionths of an inch, wherein the drive shaft of the seal unit provides the mechanical torque from the electric motor to the drive shaft of the centrifugal pump.

18. The method of claim 13, wherein the electric motor is axially supported by magnetic force applied by the thrust transfer plate magnetic element and the thrust support plate magnetic element of the at least one hybrid magnetic thrust bearing disposed inside the electric motor and by fluid film force applied by the thrust transfer plate and the thrust support plate of the at least one hybrid magnetic thrust bearing disposed inside the electric motor interacting with a fluid provided inside the electric motor.

19. The method of claim 13, wherein the electric motor comprises a plurality of rotor and stator stages.

20. The method of claim 13 wherein the centrifugal pump comprises a plurality of pump stages.

\* \* \* \* \*